United States Patent [19]

Mayer et al.

[11] Patent Number: 4,952,882
[45] Date of Patent: Aug. 28, 1990

[54] CAPACITANCE SENSOR ASSEMBLY

[75] Inventors: William N. Mayer, White Bear Lake, Minn.; Roger Oestreich, River Falls, Wis.; Daniel W. Mayer, St. Paul, Minn.

[73] Assignee: Modern Controls, Inc., Minneapolis, Minn.

[21] Appl. No.: 357,208

[22] Filed: May 26, 1989

[51] Int. Cl.$^5$ ............................................. G01R 27/26
[52] U.S. Cl. ................................... 324/670; 324/662; 324/671; 324/690
[58] Field of Search ............... 324/662, 684, 685, 671, 324/670, 669, 690

[56] References Cited

U.S. PATENT DOCUMENTS 3,764,899 10/1973 Peterson et al. .................... 324/671
3,992,665 11/1976 Preikschat ........................... 324/666
4,090,359 5/1978 Doellner ......................... 244/173 X Primary Examiner—Reinhard J. Eisenzopf
Assistant Examiner—Robert W. Mueller
Attorney, Agent, or Firm—Paul L. Sjoquist

[57] ABSTRACT

A capacitance sensor for measuring changes in thickness of a dielectric film, such as plastic film, passed through the sensor, having an upper and lower housing projecting from a back plate, the lower housing having an upper electrode surface and the upper housing having an insulator aligned with the electrode surface; the insulator having an electrode conneced to an electrical conductor; the materials for constructing the two housings, the electrode and the insulator all having a coefficient of linear temperature expansion of less than $1 \times 10^{-6}$ per degree Centigrade.

5 Claims, 2 Drawing Sheets

CAPACITANCE SENSOR ASSEMBLY

BACKGROUND OF THE INVENTION

The present invention relates to an apparatus for measuring the thickness of films such as plastic films, wherein such measurements are made by detecting capacitance variations when the film is placed in proximity to a sensing head, wherein variations in film thickness cause corresponding dielectric variations which are detected as variations in measured capacitance.

The use of capacitance measuring sensors for measuring film thickness is known in the art, one form of which is disclosed in U.S. Pat. No. 3,764,899, issued Oct. 9, 1973, and owned by the assignee of the present invention. This patent measures film thickness by passing the film through a capacitance sensor, wherein variations in film thickness are sensed as dielectric thickness variations between the capacitance members, and are detected as variations in a signal which is applied to the capacitance members.

Another form of capacitance measuring device is disclosed in British Pat. No. 2,038,483, issued July 20, 1983, and owned by the assignee of the present invention. This patent discloses a capacitance sensor for sensing film thickness changes wherein the film is passed over capacitance elements arranged in side-by-side relationship, variations in film thickness being detected as variations in a signal applied to an electrode positioned in an air gap over which the film is moved.

The present invention is an improvement in the construction of the capacitance sensor disclosed in the foregoing United States patent.

Measurement instruments of the type for which the invention finds utility are typically used to measure plastic film thicknesses in the range of 0.001–0.100 inch (1–100 mil). Such instruments should have a sensitivity to enable them to detect variations in film thickness of plus or minus 0.1 percent, and subsequent measurements should be repeatable to within about 1 percent. Thus, when a 1 mil plastic film is measured its thickness should be determined with accuracy of plus or minus 0.001 mil, in order to provide results which may be useful in the industrial process control of manufacturing the plastic film. Measurement accuracy should be maintained over a range of ambient temperatures which are found in the typical environment where such instruments are used. In industrial process control applications it is not unusual for ambient temperature changes of plus or minus 10° C to occur.

A problem in prior art measurement devices has been the inability to maintain accurate measurements of film thickness over a range of ambient temperature changes, due to the fact that the measuring device itself undergoes temperature changes which cause measurement changes exceeding the permissible accuracy range. For example, it has been found that a prior art measuring device introduced measurement errors of a magnitude approximately equal to 1 mil of equivalent plastic film thickness. Thus, if the device were used to measure plastic film of 1 mil thickness, the measurement errors caused by the temperature effects on the measurement device itself could generate a thickness measurement error of approximately 100 percent. An examination of the prior art device has led to the conclusion that the effects of temperature on the measurement device are caused both by temperature expansion and contraction of the measurement components themselves, and also by the temperature coefficients of the dielectric materials associated with the measurement instrument. Accordingly, it is an object of the present invention to provide a measurement device having a sensor head which provides exceedingly low measurement errors resulting from temperature effects on material expansion and dielectric changes.

It is another object of the present invention to provide a capacitance sensor head which is operable to within less than 0.1 percent sensitivity over ambient temperature changes of plus or minus 10° C.

SUMMARY OF THE INVENTION

A capacitive sensor for measuring changes in thickness of a plastic film which is passed through the sensor, wherein the sensor is constructed to include an elongated electrode aligned with an adjacent electrode, wherein an air gap exists between the elongated electrode and the adjacent electrode, which is electrically grounded. The invention is constructed to minimize the effects of temperature changes upon the capacitance measurements made by the sensor, both in terms of the temperature effects causing relative expansion and contraction of the dimension of the measuring components, and also in terms of the temperature effects causing relative changes in the dielectrics found between capacitive members. The elongated electrode and the adjacent electrode is adjustably affixed in a predetermined spaced-apart relationship, wherein the relationship is unaffected by temperature changes, and the electrical components are held in a dielectric media which is unaffected by temperature variations, wherein a direct electrical connection is made to the elongated electrode without passing the conductor through a material having a dielectric temperature coefficient.

DESCRIPTION OF THE PREFERRED EMBODIMENT

Figure 4:
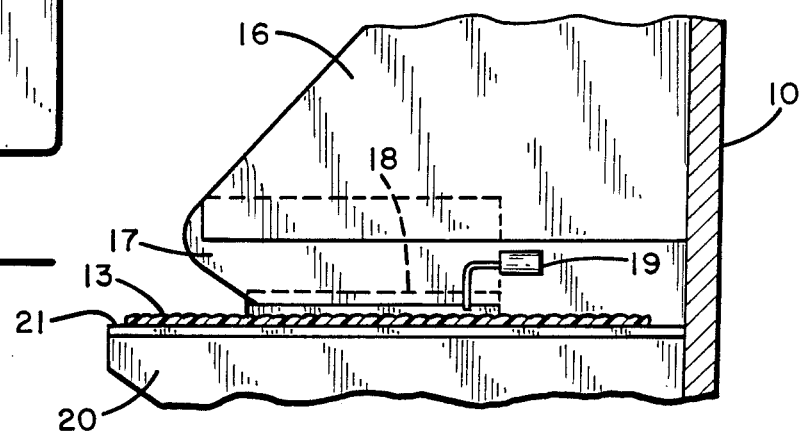
FIG. 4 shows a side view of the prior art device.

The preferred embodiment of the present invention can best be understood by reference to the prior art over which the present invention is an improvement. This prior art is shown in FIG. 4, and is described in U.S. Pat. No. 3,764,899, in conjunction with an apparatus for measuring variations in film thickness. A capacitive sensor assembly is comprised of a top portion 16 which is adapted to receive and hold an insulated insert 17. Insert 17 is provided with a groove at its lower portion that is adapted to receive and hold a longitudinally elongated electrode 18 of substantially circular cross section. A suitable conductor 19 is connected at one end of electrode 18. The top portion 16 is adjustably affixed to back panel 10 by suitable fasteners. Another electrode 20 is fixedly positioned against back panel 10. Electrode 20 has a longitudinally elongated raised portion 21 that is positioned in parallel relationship and substantially underneath electrode 18, so as to define a uniform air gap between the two electrodes. A plastic film 13 is insertable into the gap between the electrodes, and may be moved relative to the electrodes, to measure the thickness and variations in the thickness of the plastic film 13. Electrode 18 is affixed in the groove of insert 17 by an adhesive fastener such as epoxy. It has been found that this technique for affixing electrode 18 to insert 17 leads to measurement inaccuracies. The inaccuracies have been caused by the epoxy adhesive which is used to affix electrode 18 to insert 17, which adhesive has a relatively high coefficient of linear expansion with temperature, and has also been found to have a temperature-variant dielectric value. Since the inherent accuracy of the instrument is critically dependent upon perceived capacitance measurements, any change of the perceived capacitance measurement with temperature will lead to inherent inaccuracies. Such a change occurs with the dielectric value of the epoxy adhesive material between electrode 18 and the top portion 16 of the sensor assembly.

In the prior art as shown in FIG. 4, back panel 10 and the top portion 16 of the electrode assembly are typically constructed of aluminum, as is the lower electrode 20. The insulator 17 is constructed of Macor, and the electrode 18 is constructed of Invar.

In operation, the prior art device of FIG. 4 is adapted to receive a plastic film material between the electrodes, wherein the film material may be passed through the air gap. An electrical signal is applied to the elongated electrode 18, and conductor 19 is monitored for changes in electrical signal characteristics. Such signal changes are empirically derived to be representative of the thickness of the plastic film material 13 as it passes through the sensor air gap. The signals remain relatively constant when the plastic film material is of unchanging thickness, but variations in film thickness are detected as variations in the signal, which may be further processed to provide a visual or other indication of thickness variation.

It has been found that the prior art sensor is also sensitive to temperature changes in the environment in which the sensor is used, which may seriously affect the accuracy of the sensor, particularly when measuring relatively thin plastic films, and when accuracies in the range of 35 0.1 percent are desired. Under these conditions, the capacitance changes caused by relatively small variations in film thickness are eclipsed by capacitance changes caused by the temperature effects upon the sensor itself. For example, a plastic Mylar film of nominal thickness of 1.0 mil was measured by a sensor of this type, wherein a change in the thickness of the Mylar film of 0.001 mil resulted in a change in the capacitance measurement of $8.3 \times 10^{-5}$ pF. However, it has been found that a change in the ambient temperature in which the prior art device of FIG. 4 is used, in the amount of 10° C, will itself produce an apparent capacitance change of $100 \times 10^{-5}$ pF, which is equivalent to an apparent Mylar film with a thickness change of more than 0.01 mil. Therefore, the accuracy of the prior art sensor is less than 0.01 mil under normal ambient temperature change possibilities. Using the prior art device of FIG. 4, it is therefore impossible to achieve a film thickness accuracy of 0.1 percent, without changing the construction of the device.

In analyzing the causes of the signal variations with changes in temperature, it was determined that the causes are two-fold: (1) the coefficient of linear expansion of the respective materials causes the component spacing to vary with temperature; and (2) the dielectric constant of the respective insulator components also has a temperature coefficient which causes variations in apparent capacitance measurements. For example the coefficient of linear expansion for aluminum is $23 \times 10^{-6}$ per degree Centigrade. However, when a solid is heated it does not just increase in length, it increases in all dimensions; the coefficient of area expansion is approximately two times the coefficient of linear expansion. By contrast, the coefficient of linear expansion of Invar is $0.9 \times 10^{-6}$ per degree Centigrade, which is relatively stable. The coefficient of linear expansion of copper is $17 \times 10^{-6}$ per degree Centigrade. The prior art uses an Invar rod 18 centrally positioned in a slot in an insulator support 17, with an air gap through which the film material 13 may be passed. The lower electrode 20 is constructed of aluminum. These materials are affected differently with increases in temperature; the aluminum top portion 16 and lower electrode 20 are subjected to a coefficient of linear expansion on the order of $23 \times 10^{-6}/°$ C, the insulator 17 is subjected to a coefficient of linear expansion on the order of $9.4 \times 10^{-6}/°$ C, and the Invar rod is subjected to a coefficient of linear expansion of $0.9 \times 10^{-6}/°$ C as well as a coefficient of area expansion of approximately the same magnitude. Therefore the heating of the prior art sensor causes the relative dimensions of the respective components to be affected differently, thereby changing the spacing and positions of the respective components, causing variations in measured capacitance.

The dielectric constant of the insulator 17, which is a material known by the trade name Macor, is approximately 5.9, for this material also exhibits a temperature variation of the dielectric constant of about 169 parts per million per °C (ppm/°C). This variation produces an apparent change in dielectric constant, and this change alone has been measured to produce an apparent capacitance change of $1.2 \times 10^{-4}$ pF/°C, which is sufficient to introduce significant error in measurements made with the prior art device over normal ambient temperature ranges. The epoxy adhesive material which is used to affix electrode 18 to insulator 17 exhibits a temperature variation of the dielectric constant of about 3,550 parts per million per degree Centigrade (ppm/°C), which can produce a rather dramatic apparent change in capacitance measurements, with change in temperature. Thus, it is apparent that both the construction and the material selection must be changed if the prior art device is to be adapted to a measurement accuracy of 0.1 percent.

Figure 1:
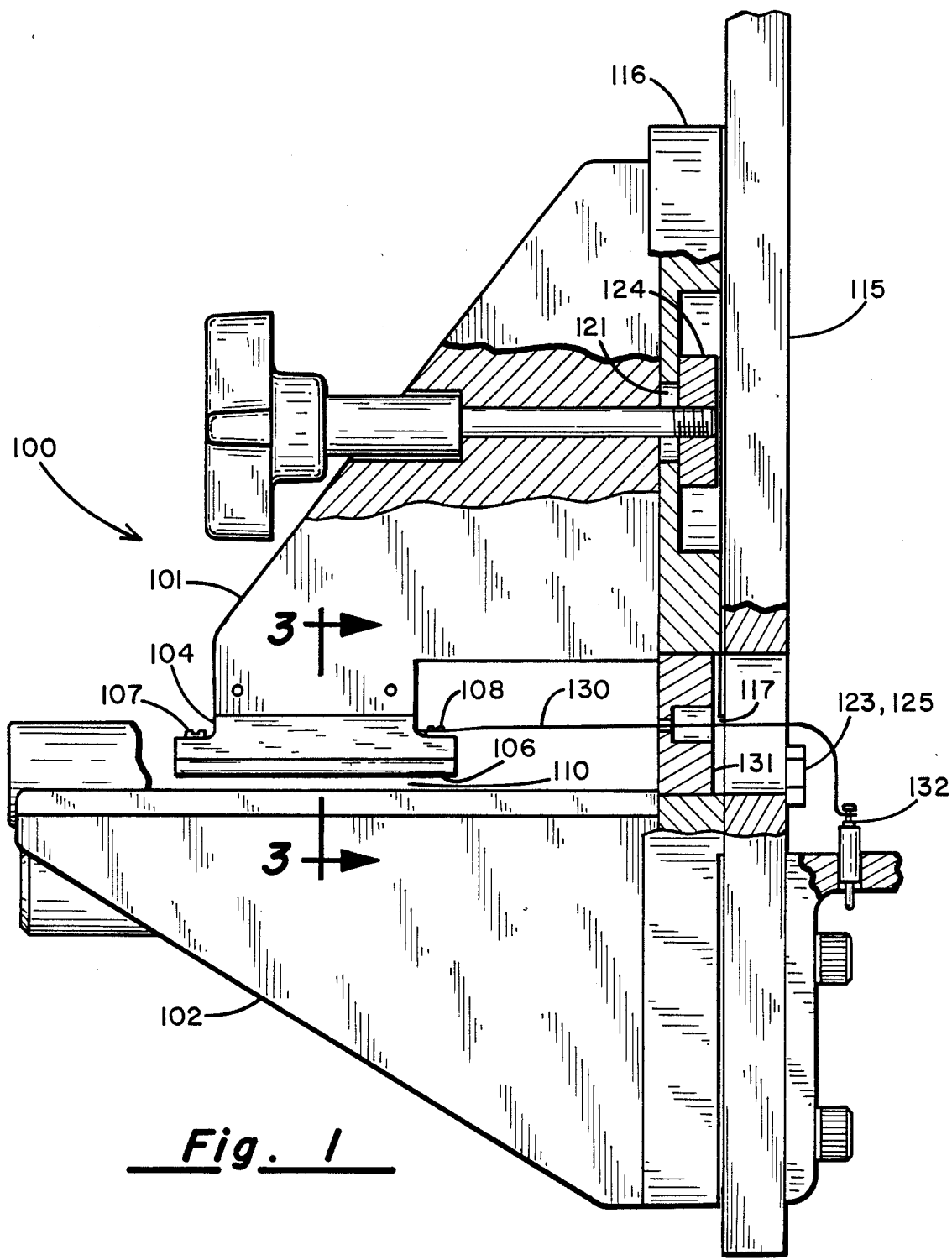
FIG. 1 shows a side view of the invention.

FIG. 1 shows a sensor 100 constructed according to the teachings of the invention. Sensor 100 has a top portion 101 which is made from Invar, and a bottom electrode 102 which is also made from Invar. An insulator 104 is affixed to the top portion 101, projecting downwardly toward an air gap 110. Insulator 104 is constructed from a material known as Vycor, which is chosen because it exhibits a change in dielectric constant with temperature of −22 parts per million per °C (ppm/°C), and it has a coefficient of linear temperature expansion of less than $1 \times 10^{-6}$ per °C, and its coefficient of temperature expansion is nearly identical to Invar. Tests were conducted on this material to determine whether reasonable temperature variations, i.e., 35 10° C, cause a measurable change in the dielectric constant to thereby yield an apparent capacitance variation as a function of temperature. These tests showed that the apparent capacitance variation attributable to the temperature effects of this dielectric material were less than $1 \times 10^{-5}$ picofarads (pF). This degree of variation is acceptable in order to achieve the accuracy desired from the capacitance sensor 100.

Electrode 106 is mounted across the lower surface of insulator 104, and electrode 106 is constructed of Invar. Screws 107 and 108 are also made from Invar, and pass downwardly through insulator 104, and are threadably affixed to electrode 106 to secure electrode 106 against insulator 104 without requiring an epoxy adhesive. A conductor 130 is captured by screw 108, and conductor 130 passes through an aperture in insulator 131 to an external connecting junction 132. It is this conductor that transmits the signals which are necessary for a determination of capacitance measurement.

The foregoing construction is selected first to provide materials for the entire assembly which have substantially identical coefficients of temperature expansion, thereby providing a sensor 100 in which the several components will respond nearly identically to changes in temperature in the environment. Second, the construction provides for rigidly affixing all of the components together, thereby providing no condition where a particular component may deviate in a critical dimension in a direction which accentuates the corresponding temperature variation of another component. Third, the component materials are selected not only to provide substantially identical coefficients of linear temperature expansion, but also to provide no material which has a coefficient of temperature expansion no greater than $1 \times 10^{-6}$ per °C. Materials falling within this constraint demonstrate temperature stability which enables the desired sensor capacitance measuring accuracy to be controlled. Fourth, the construction enables an electrical conductor to be affixed to sensor electrode 106 by a direct and positive connection via screw 108, and conductor 130 passes through an aperture in insulator 131. No dielectric materials are placed intermediate conductor 130 and electrode 102 or upper portion 101, thereby eliminating any possibility of temperature effects on such materials and removing an important source of temperature variation found in the apparent capacitance changes in the device of the prior art. The temperature effects of the dielectric found in insulator 131 on the signals carried by conductor 130 are negligible.

Figure 2:
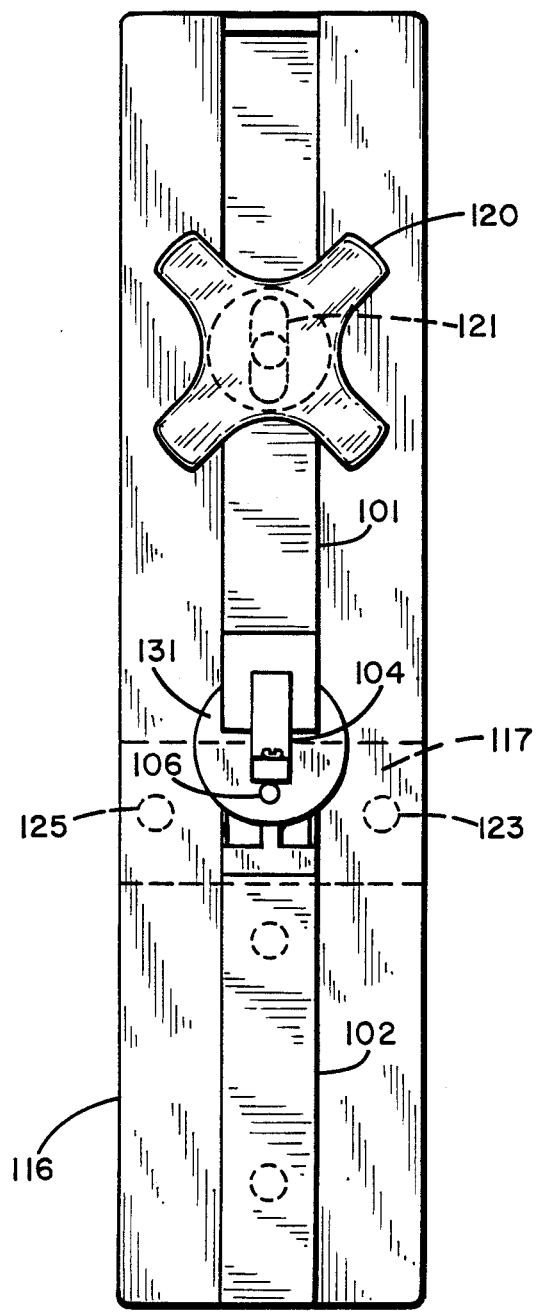
FIG. 2 shows a front view of the invention.
Figure 3:
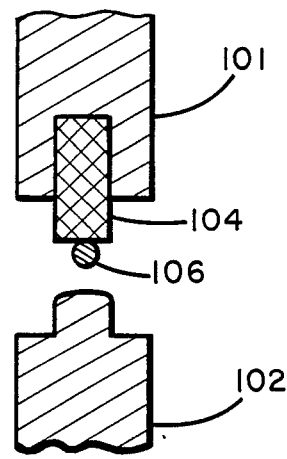
FIG. 3 shows a cross-sectional view taken along the lines 3—3 of FIG. 1.

·FIG. 2 shows a front elevation view of the invention and FIG. 3 shows a cross-sectional view taken along the lines 3—3 of FIG. 1. Top portion 101 is vertically adjustable by a knob 120, which is affixed to a threaded shank and is threadable into a nut 121 behind back plate 116. Back plate 116 has a raised section 117 which forms a mounting surface for attaching back plate 116 to plate 115. The attachment is made by means of threaded fasteners 123, 125, which anchor back plate 116 to plate 115 essentially along a single line. Therefore, if plate 115 expands or contracts with temperature, no temperature stresses are placed upon sensor 100, because sensor 100 is affixed to plate 115 only at a single location.

Top portion 101 has a slot 121 therethrough, to permit a limited degree of vertical movement when making the adjustment for top portion 101. Bottom electrode 102 is rigidly affixed to back plate 116 by suitable fasteners, and is not normally adjustable. Insulator 104 is affixed in a suitable groove in top portion 101, and electrode 106 is threadably fastened to insulator 104 by fasteners 107 and 108. The bottom side of insulator 104 is a flat surface, and electrode 106 is preferably circular in cross section, with a flat surface formed along a top and bottom edge.

In operation, top portion 101 is initially vertically adjusted to provide an air gap spacing 110 which is slightly larger than the thickness of the film material to be tested. The film material is then passed through this air gap, between electrodes 106 and 102, and the electrical signal on conductor 130 is monitored by appropriate circuitry. The signals generated on conductor 130 are amplified and sent to various types of indicating mechanisms, which may be of the form of meters, computer input signals, gauges, etc. The signals generated by this process provide an indication of thickness variation as the film is passed between the electrodes of the sensor. As a result of these measurements adjustments may be made in the industrial film-making process in order to ensure proper and reliable film thicknesses.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A capacitance sensor adapted for attachment to a mounting plate, for measuring changes in thickness of a dielectric film which is passed through the sensor, comprising
   (a) a back plate having means for affixing to said mounting plate a long a line of connection;
   (b) a lower housing affixed to said back plate, said lower housing having an elongate upper electrode surface projecting substantially normal to said block plate, said lower housing being made from a material having a coefficient of linear temperature expansion of less than $1 \times 10^{-6}$ per degree Centigrade;
   (c) an upper housing attached to said back plate, said upper housing having an elongate portion projecting substantially normal to said back plate and in substantial alignment with said lower housing electrode surface, said upper housing having an elongate groove facing toward said lower housing electrode surface, and said upper housing being made from a material having a coefficient of linear expansion of less than $1 \times 10^{-6}$ per degree Centigrade;
   (d) an insulator affixed in said upper housing elongate groove and projecting downwardly toward said lower housing electrode surface, said insulator having a lower edge facing toward said lower housing electrode surface, and said insulator extending beyond the length of said upper housing elongate groove, said insulator being made from a material having a coefficient of linear temperature expansion of less than $1 \times 10^{-6}$ per degree Centigrade; said insulator material having a dielectric temperature characteristic so as to produce a capacitance change with temperature no greater than $1 \times 10^{-6}$ picofarads per degree Centigrade;
   (e) a sensor electrode affixed to said insulator lower edge, in direct contact with said insulator material, said sensor electrode being made from a material having a coefficient of linear temperature expansion of less than $1 \times 10^{-6}$ per degree Centigrade.

2. The apparatus of claim 1, further comprising threaded fasteners affixing said sensor electrode to said insulator, at least one of said threaded fasteners having an electrical conductor attached thereto.

3. The apparatus of claim 1, wherein said upper housing, said lower housing and said sensor electrode are all constructed of the same material.

4. The apparatus of claim 3, wherein said same material is Invar.

5. The apparatus of claim 4, wherein said insulator is constructed of Vycor material.

* * * * *

UNITED STATES PATENT AND TRADEMARK OFFICE
CERTIFICATE OF CORRECTION

PATENT NO. : 4,952,882
DATED : August 28, 1990
INVENTOR(S) : William N. Mayer, Roger Oestreich, Daniel W. Mayer It is certified that error appears in the above-identified patent and that said Letters Patent is hereby corrected as shown below:

On the title page:

In the Abstract, line 7, "conneced" should be -- connected --.

In column 3, line 41, "35 0.1" should be -- ± 0.1 --.

In column 4, line 60, "35 10°" should be -- ± 10° --.

In claim 1, column 6, line 27, "block" should be -- back --.

Signed and Sealed this

Third Day of March, 1992

Attest:

HARRY F. MANBECK, JR.

*Attesting Officer*  *Commissioner of Patents and Trademarks*